April 8, 1952 S. A. YOUNG 2,591,991
EXPOSED MIXING CHAMBER, MASK, RETAINER, AND
VALVE CONTROL ASSEMBLY
Filed Oct. 21, 1947
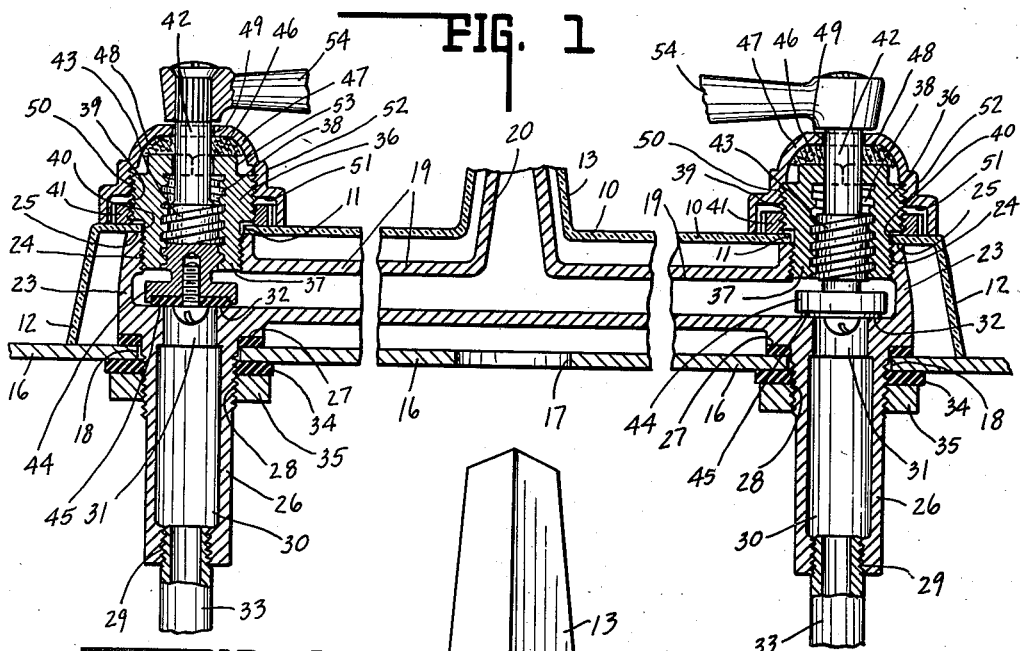
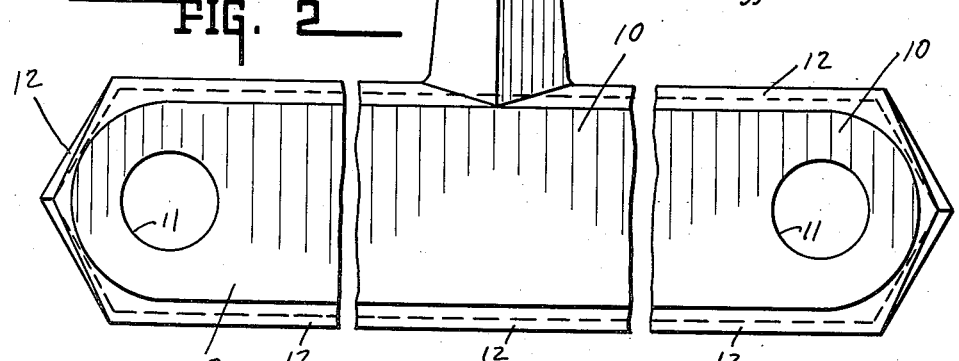
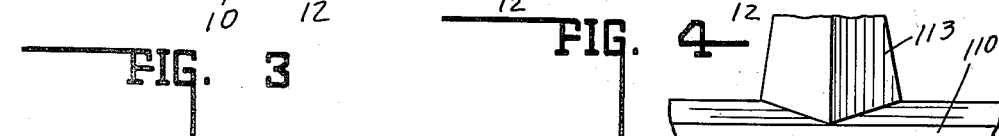
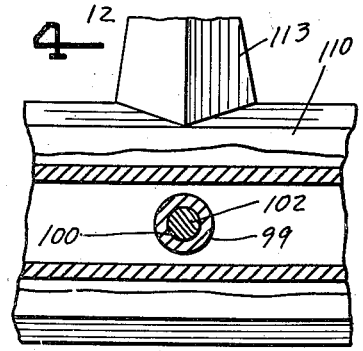
INVENTOR.
STEPHEN A. YOUNG.
BY
Lockwood, Goldsmith & Galt
ATTORNEYS.

Patented Apr. 8, 1952

2,591,991

UNITED STATES PATENT OFFICE 2,591,991

EXPOSED MIXING CHAMBER, MASK, RETAINER, AND VALVE CONTROL ASSEMBLY

Stephen A. Young, Delphi, Ind.

Application October 21, 1947, Serial No. 781,230

2 Claims. (Cl. 137—111)

This invention relates to a canopy, and mixing fixture concealed thereby and both mountable in exposed relation relative to a sanitary fixture such as a basin, bowl or tub.

One chief object of the present invention is to provide a structure of the aforesaid character wherein the canopy can be made of any suitable material such as glass, porcelain, plastic, metal and the like by usual commercial production methods and which canopy, even if of frangible material, may be rigidly mounted without being subject to rupturing stresses and strains.

Another chief object of the present invention is to provide a structure wherein parts may be readily, economically and expeditiously assembled and adjusted and disassembled as desired or required.

One feature of the present invention resides in the structure mounting the canopy upon the mixing fixture so that the latter is concealed thereby and is rigid with the sanitary fixture.

Another feature of the present invention resides in the removable stem associated sleeve.

A third feature of the present invention resides in the bonnet utilized whereby all parts necessary for adjustment or replacement are exposed when the bonnet is removed.

Other objects and features of the invention will be set forth more fully hereinafter.

The full nature of the invention will be understood from the accompanying drawings and the following description and claims:

In the drawings

Fig. 1 is a central sectional view of the invention and a portion of a sanitary fixture to which the same is applied, the major portion of the spout being omitted.

Fig. 2 is a top plan view of the combination canopy and spout, with superstructure such as valve handles and bonnets omitted.

Fig. 3 is an end elevational view with parts broken away to show the mixing unit, canopy spout connection and spout in central section.

Fig. 4 is a plan view of the central portion of a modified form of canopy, parts being broken away to show the mixing unit variation, whenever a drain valve control is to be associated therewith.

In the figures there is illustrated a unitary canopy and spout structure having a top plate portion 10 apertured as at 11 at opposite ends and provided with a peripheral outwardly flared skirt 12. Integral therewith and medianly disposed is the outwardly and angularly directed spout portion 13 with reversely directed mouth 14. The junction between spout 13 and skirt 12 (as it were) constitutes a tapered seat 15, see Fig. 3.

The aforesaid unit may be a casting, forging or the like. It may be of frangible or metallic material. Also it may be of plastic. It may be of various colors and preferably is opaque.

In Fig. 1, 16 indicates a portion of a sanitary fixture such as a bowl, basin, tub and the like. Usually same is provided with three aligned holes, 17 indicating the intermediate and 18 the end holes.

It heretofore has been the custom to mount the mixing unit below (having reference to Fig. 1) the fixture 16 and have the hot and cold water valve controls exposed by and projecting through openings 18. Also the spout from the mixing chamber was disposed above and extended through opening 17. In some instances an ornamental support bracketed or included all three aforesaid and was disposed above the fixture.

All of these installations require special care in erection, extra work in the same and extra work for repair and replacement purposes. The present invention has none of these objections and many advantages as hereinbefore and hereinafter pointed out, all, however, flowing from the fact that the mixing unit is disposed forwardly (upwardly in Fig. 1) of the sanitary fixture. Thus the mixing chamber may be mounted at the time the plumbing is "roughed in" and thereafter the assembly easily completed.

The mixing unit includes an elongated rectangularly sectioned chamber forming body 19 which medianly includes an upwardly and outwardly directed short or rudimentary spout member 20 having tapered end 21. The latter as shown in Fig. 3 is disposed adjacent seat 15 of the canopy spout when the canopy covers or masks the mixing chamber unit. Therebetween is disposed a sealing gasket 22. This may be of lead, rubber, fibre, or graphite or a combination thereof. The sole requirement is that spout 20 discharge to spout 13 with no leakage when the liquid is pressure supplied or the pressure is cut off.

The mixing chamber body 19 is closed at opposite ends 23, see Figs. 1 and 3, and the outer face at each end is apertured and threaded as at 24, the size thereof being less than opening 11 of the canopy, the latter however being less than the boss surrounding the aperture 23 so that the canopy can bear upon the face 25.

The spacing between openings 24 conforms to that between openings 11 aforesaid. Opposite each threaded opening 24 is a tubular extension 26 that is shouldered at 27, externally threaded at 28 and the end is internally threaded at 29. The bore 30 is slightly constricted where it communicates with the chamber proper as at 31 and the face 32 adjacent thereto forms a valve seat. Threaded into each end at 29 is the water supply pipe 33. Washers 34 and nuts 35 clampingly retain or secure the mixing chamber body to the sanitary fixture 10 when the tubular extensions are seated in openings 18 therein. As stated all the aforesaid can be installed in the "roughing in" operation.

Each threaded opening 24 is adapted to take the externally threaded reduced end 37 of sleeve 36 having its internal bore provided with a coarse thread 38. The upper end of the sleeve is externally threaded at 39. If desired, the junction between the two externally threaded portions may be further reduced as by external channel 40, the width of which is slightly in excess of the thickness of body portion 19 of the canopy.

After the mixing chamber body is connected to the supply lines, and if desired secured rigidly to the sanitary fixture, as described, the canopy and spout is applied so that holes 11 then register with threaded openings 24, the canopy resting on faces 25. Then the sleeves 36 are threaded into openings 24 which traps the canopy, as it were. Then nuts 41 are threaded upon the sleeves until said nuts clamp the canopy to the body 19.

Stem 42, having coarse thread 43 and valve end 44 with bibb 45, can then be applied to the sleeve bore. Then the graphite or like packing 46 is applied to the stem and the shell or bonnet 47 applied. The latter includes packing accommodating surface 48, stem aperture 49, internal thread 50 and counterbore 51. Exteriorly it may have flat faces 52. Sleeve 36 also may have flat faces 53 for tool engagement. Handle 54 may be secured to stem 42 in any conventional manner.

The counterbore 51 accommodates nut 41. Threads 39—50 insure packing 46 compression. Thus a rigid leak-proof assembly results and turning the handle advances bibb 45 toward and away from seat 32 to regulate flow from its supply line 33 to the mixing chamber and spout 20. The sleeve 36, stem 42, and associated parts, including the lock nut 41 may be properly denoted as a control unit.

Disassembly for repair, inspection, replacement, etc., may be effected in the reverse manner whenever desired or required and obviously no plumber is required. For bibb replacement only handle 54, shell 47, and gasket 46 need be removed to permit of stem assembly removal. For seat refacing the nut 41 and sleeve 36 are removed. This exposes seat 32 through apertures 11 and 24, the conventional facing tool being threadingly mounted in the latter so that the valve seat is true relative to the stem axis.

Accordingly the only strain imposed upon the canopy is that imposed at seat or gasket 22 and between faces 25 and nuts 41. Thus if the canopy is of frangible material canopy mounting will not stress same sufficient to fracture same.

In Fig. 4 a modified form of the invention is illustrated. The mixing chamber in this instance is provided with an island 99 bored as at 100 to register with the sanitary fixture aperture 17 therebeneath.

The canopy includes central hole, not shown, in alignment with aperture 17. A push-pull rod, or rotative element 102 is mounted in both openings 17 and 102 and accommodated by the bore 100. Above the canopy any suitable handle may be mounted thereon. Below the fixture the element 102 may be connected to any suitable drain valve operating mechanism for fixture drain control purposes.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In combination, a fluid control body, an inlet thereto, a control unit for said inlet, a rudimentary outlet member integral with said body and having a fluid passage thereto, a canopy seated on said body, a discharge spout member integral with said canopy having a fluid passage formed therein, and means for fastening said canopy to said body with the fluid passage in said rudimentary outlet member aligned with and in sealing engagement with the fluid passage in the discharge spout member of the canopy.

2. In combination, a fluid control body, a fluid supply inlet thereto, a control unit for said inlet and an outlet member integral with said body having a fluid passage therein, a canopy seated on said body, a fluid discharge spout integral with said canopy having a fluid passage formed therein, and means for fastening said control body to the canopy with the fluid passage in the body in sealing alignment with the fluid passage in said discharge spout.

STEPHEN A. YOUNG.

REFERENCES CITED

The following references are of record in the file of this patent:

UNITED STATES PATENTS

| Number | Name | Date |
|---|---|---|
| 1,187,613 | Divekey | June 20, 1916 |
| 1,566,273 | Gade | Dec. 25, 1925 |
| 1,754,217 | August | Apr. 15, 1930 |
| 1,935,971 | Wuestoff | Nov. 21, 1933 |
| 2,218,662 | Smith | Oct. 22, 1940 |
| 2,233,267 | McGarry | Feb. 25, 1941 |
| 2,355,736 | Klein | Aug. 15, 1944 |
| 2,474,108 | Kadish | June 21, 1949 |